United States Patent
Nakazawa et al.

Patent Number: 5,127,949
Date of Patent: Jul. 7, 1992

[54] WET FRICTION MATERIAL

[75] Inventors: Shiro Nakazawa; Mikio Fujiwara, both of Kawasaki, Japan

[73] Assignee: Toshiba Tungaloy Co., Ltd., Kawasaki, Japan

[21] Appl. No.: 575,641

[22] Filed: Aug. 31, 1990

[30] Foreign Application Priority Data

Oct. 18, 1989 [JP] Japan .................................. 1-270952

[51] Int. Cl.⁵ .................................................. C09K 3/14
[52] U.S. Cl. ................................... 106/36; 252/378 R
[58] Field of Search ............................................ 106/36

[56] References Cited

U.S. PATENT DOCUMENTS

| | | | |
|---|---|---|---|
| 1,137,373 | 4/1915 | Aylsworth | 252/378 R |
| 3,404,061 | 10/1968 | Shane et al. | 252/378 R |
| 4,363,884 | 12/1982 | Ogiwara | 523/156 |
| 4,593,070 | 6/1986 | Oyama | 523/158 |
| 4,946,892 | 8/1990 | Chung | 252/511 |

FOREIGN PATENT DOCUMENTS

| | | | |
|---|---|---|---|
| 1258884A | 5/1985 | Japan | 106/36 |
| 1258885A | 5/1985 | Japan | 106/36 |
| 1079653A | 3/1982 | U.S.S.R. | 106/36 |

*Primary Examiner*—William R. Dixon, Jr.
*Assistant Examiner*—Margaret V. Einsman
*Attorney, Agent, or Firm*—Foley & Lardner

[57] ABSTRACT

There is disclosed a wet friction material which comprises 5 to 40% by weight of a thermosetting resin as a binder component with the balance being a filler, wherein the filler includes at least a rubber and an exfoliated graphite.

11 Claims, 6 Drawing Sheets

Allowable energy absorption curve

Thermal Aging Test : Change in modulus of elasticity

WET FRICTION MATERIAL

BACKGROUND OF THE INVENTION

This invention relates to an organic friction material for facing or lining of the so-called wet system brake or clutch to be used in the presence of an appropriate lubricating oil (cooling oil).

Wet friction materials employed in the prior art include sintered metal type friction materials, paper type friction materials, woven type friction materials, mold type friction materials and rubber type friction materials, and among mold type friction materials, there is a graphite type friction material composed mainly of graphite or coke, and there is also a resin mold type friction material composed mainly of various fillers.

Among these friction materials, sintered metal type friction materials have excellent heat resistance as well as high thermal conductivity, and have been employed for heavy duty uses. However, when a friction plate becomes larger in scale, it becomes difficult to make uniformly precise friction plates on account of the restriction in working, whereby partial contact with a mating or opposing plate occurs, and inconveniences are involved such that the friction plate receives concentrated thermal loading in that region which exceed the seizure limit, or undergoes plastic flow.

For this reason, it has been considered to effect dissipation of heat by plastic deforming the friction plate to bring it in contact uniformly with the whole surface of the mating plate. As the friction material for this purpose, there are paper type, rubber type, graphite type and resin mold type, and particularly paper type and rubber type have been increasingly employed.

Paper type friction materials are prepared by the paper making method by adding various additive components to cellulose fibers as the main component and binding them with a phenol resin, and have about 40 to 50% of communicated pores. Since they have a large plastic deformation amount by pressure, they can readily contact with the whole surface of the mating plate, and are deemed to be well compatible. Cellulose fibers have advantages of good affinity for oils and also high frictional coefficient, and hence have been used in large amounts as the material with high power absorption (or rate of energy dissipation) under medium and low energy absorption (or energy dissipation).

However, a drawback of the paper type material is that, since elasticity is obtained through entanglements of fibers, recovery response after pressure deformation is inferior. Also, the fibers are oriented in a certain direction by sheet making, and therefore the surface roughness of the mating plate is required to be made 1 $\mu$m or less. Otherwise, there are also problems of stroke adjustment, etc. during pressurization, and fluctuation of frictional coefficient depending on pressure, and the loading capacity is inferior to rubber type.

To improve the paper type material, there is a material in which pulp powder is added in the granulated state as disclosed in Japanese Patent Publication No. 27755/1978, and which material has fibers randomly oriented, thus improving wear resistance and pressure response while maintaining the advantages of the paper type material.

Next, in the case of the rubber type friction material, whole surface contact with the mating plate is obtained through elastic deformation. For this reason, many attempts have been made to use materials enriched in elasticity with low modulus. There have been proposed a friction material using a fluoroelastomer as the binder (Japanese Provisional Patent Publications No. 18749/1977 and No. 85878/1982), a material using an epoxy resin and a nitrile rubber (Japanese Patent Publication No. 2733/1982) and a material using a phenol resin and a nitrile rubber (Japanese Provisional Patent Publication No. 92983/1981). All of these materials have a modulus of elasticity of about 10 to 60 kg/mm$^2$, have desirable elasticity in the engaged pressures generally employed, and also can be softened by heating even when causing partial contact to occur, thereby enabling treatment energy dissipation through whole surface contact. Thus, under certain use conditions, a material having very high seizing resistance (not heat resistance) has appeared. It is also a specific feature of rubber type that power absorption is very high in uses of medium and low energy absorption.

However, rubber type friction materials have drawbacks depending on the kinds of rubbers, and also common to all of rubber type.

Fluorine rubber type is excellent in heat resistance and oil resistance. However, since fluorine rubber itself has weak strength, expensive materials must be used in large amounts for obtaining necessary material strength, posing a problem with respect to cost. Also, for the same reason, it is difficult to obtain a material with a large amount of porous materials or fillers added therein, and there is also restriction in frictional characteristics.

Rubbers other than fluorine rubber are mostly materials enriched in integrity with resins, and can be polymerized as the binder with other resins or added by mixing with resins. However, these rubbers proved to be not satisfactory in performances for brakes or clutches which are used under severe conditions with respect to heat resistance, oil resistance and thermal aging characteristic. For example, in the case of a material using a carboxy-modified nitrile rubber covalently bound to an epoxy resin as the binder, although very high power absorption can be obtained if energy absorption is small, but under the use conditions where energy absorption is great or the temperature of the whole material becomes higher, such as continuous slip, inconveniences such as buckling or abnormal wear of the material occurs, whereby only very low power absorption could be applied. Also, most of these rubbers have double bonds remaining in the molecule, and also the degree of freedom between molecules is higher as compared with thermosetting resins. Therefore, by the influence of high temperature and oil additives, they undergo decomposition, oxidation, swelling or chemical reactions, whereby various properties such as hardness, elasticity and strength change, thereby involving inconveniences such as marked impairment frictional characteristics such as seizing resistance, friction coefficient and wear.

The friction material by use of a rubber as a part of the binder is prepared generally using a conventional rubber molding method, namely by blending the respective components by means of a kneader such as kneading rolls and Banbury mixer, then applying the blend onto calendering rolls to obtain a sheet, which sheet is placed into a mold to be cured by heating, or charging directly the blend into a mold such as compression transfer molding to be cured therein. However, the porosity of the material is as little as several %, and the cooling effect of the oil can be extended into the inner part of the material only with difficulty, and also troubles may occur in the discharging effect of the oil existing at the interface with the mating material, with concomitant inconveniences such as lowering in friction coefficient depending on the use conditions.

Further, another great drawback of the rubber type is low heat resistance. When a rubber is used as a part of the binder, the material strength becomes generally extremely weak at a temperature of 150° C. or higher, and, at a temperature of 200° C. or higher, most materials are lowered in strength as a matter of course, or may be decomposed even within a short time. For this reason, buckling, abnormal wear and lowering in friction coefficient of the material through compression and shearing force by sliding will occur. Whereas, for heavy duty friction materials for wet system, the material strength under the state elevated to a temperature of 200° to 250° C. is very important even for a relatively short time. Under the use conditions demanded presently for heavy duty materials, the situation where the mating plate, the friction plate and, the lubricant oil as a whole routinely reaches a temperature up to 200° to 250° C. is conceivable, and in fact, does occur in practical applications. However, the lubricant oils frequently used currently have ignition points of 230° to 240° C., and it is not desired for safety that the lubricant oil as a whole is exposed to a temperature near the ignition point, and thus the temperature around this temperature may be considered to be the maximum available temperature under the present situation.

Next, the graphite type or the coke type friction materials are superior in heat resistance but inferior in modulus of elasticity as compared with the rubber type and the paper type, and more suited for high energy absorption but inferior in energy absorption capacity as compared with the rubber type.

Most of the resin mold type friction materials exhibit performances between the paper type and the rubber type, and have relatively higher friction coefficients, and high power absorptions in medium degree of energy absorption. They have high heat resistance, that is, thermosetting resins such as a phenol resin, an epoxy resin, a urea resin, a melamine resin and a polyimide resin generally used for friction materials are also equipped with mechanical elements required during sliding even in use under the temperature conditions of 200° to 250° C. for a short time, and particularly a polyimide resin can withstand temperatures of 250° C. or higher.

SUMMARY OF THE INVENTION

An object of the present invention is to provide a wet friction material which overcomes the drawbacks of the above-mentioned material, and exhibits stable and high performance friction characteristics over a long term even under heavy duty use conditions.

According to the investigations made by the present inventors, the binder forming the skeleton of the friction material should be a resin which is high in heat resistance and also chemically stable as described above, and the elasticity necessary for the whole surface contact with the mating plate should be obtained from the additive component (filler). As the filler for obtaining elasticity, rubbers are preferred for such reasons that pressure response is excellent, the deformed amount when load is applied is large, and the recovery when load is removed is rapid. Accordingly, addition of a rubber in particulate state as the filler is a considerably effective means. However, when a rubber is added to a sufficient amount until necessary elasticity can be obtained, the possibility that the rubber may be changed with heat or chemical reaction is great, whereby stability of friction characteristics is lacking.

Accordingly, the present inventors investigated and experimented variously about the addition method of rubbers to fillers, to accomplish the present invention.

More specifically, the content of the present invention is a friction material comprising 5 to 40% by weight of a thermosetting resin as the binder component with the balance being a filler, wherein said filler comprises at least a rubber and an exfoliated graphite or said filler comprises an exfoliated graphite impregnated or coated with a rubber. Further, the above filler may contain a porous pulp granulated powder partially bound with a thermosetting resin in addition to the exfoliated graphite impregnated or coated with the rubber. The content of the exfoliated graphite impregnated or coated with a rubber may be preferably 1 to 60% by weight, and when a porous pulp granulated powder partially bound with a thermosetting resin is included, the porosity of the granulated powder is preferably 20 to 70%.

DESCRIPTION OF THE PREFERRED EMBODIMENTS

The exfoliated graphite of the present invention comprises crystals of a graphite in the form having hexagonal-shaped planes of natural or artificial graphite laminated in layers by physical or chemical action, of which crystals are expanded in interlayer distances ranging from several fold to several hundred, preferably 2-fold to 200-fold.

For the rubber for impregnation or coating, general rubbers excellent in heat resistance and, oil resistance may be employed. Preferred examples may be selected from natural rubber, NBR (acrylonitrile-butadiene rubber), SBR (styrene-butadiene rubber), acryl rubber, thiocol rubber, urethane rubber, epichlorohydrin rubber, silicone rubber, fluorine rubber and hydrogenated or modified rubbers of these.

The composition ratios employed in the present invention indicate that any one of various characteristics such as friction coefficient, wear resistance, durability and strength of the friction material, etc. will deteriorate, if the amount of any component falls outside of these ranges.

More specifically, if the amount of thermosetting resin binder present is less than 5%, the material strength is so weak as to bring about a defect in the material, which is increased wear, while on the contrary if it is 40% or more, such inconveniences may occur that plastic flow during heavy duty may be generated or no desired friction coefficient or stable friction coefficient can be obtained.

The amount of exfoliated graphite impregnated or coated with a rubber preferably ranges from 1 to 60% by weight since this range is economical with high addition effect.

The reason for the preferred amount of the porosity of the pulp granulated powder is because elasticity and oil containment are poor if it is 20% or less, while if it is 70% or more, problems will occur in strength and apparent plastic deformation amount.

The method for manufacturing the friction material of the present invention is not particularly limited, but a powder metallurgic manufacturing method may be employed as a preferred example.

Filler and resin components are blended in an appropriate blender such as V-type blender, Henschel mixer, Ledige mixer and others, the blend is charged into a mold and compression molded. The compression molded green compact is molded by heating to effect curing through the reaction of the resin components. It is of course possible to carry out heating simultaneously with compression molding, and the molding can be also adhered to a metallic support simultaneously with heat curing.

One feature of the present invention is the addition of a rubber and an exfoliated graphite simultaneously, and more effectively addition of an exfoliated graphite impregnated or coated with a rubber, and another feature is the further addition of a granulated powder comprising pulp powder as the main component and bound with a thermosetting resin to the material. The present invention exhibits sufficient effect even with only the first feature, which is an independent invention, but by addition of granulated powder of the second feature, the influence of oil additives or the influence of heat which may be a factor with respect to the case of only the first feature can be dispersed, and also the dynamic coefficient of friction can be enhanced as well as improved frictional characteristics such as a reduced difference between the dynamic coefficient of friction and the static coefficient of friction.

Graphite has been added in the art as a typical lubricating component in the friction material, has large heat content, improves seizing resistance imparting characteristic to a great extent, and is also excellent in thermal stability and chemical stability. The present invention, by combining this with a rubber, forms a filler with excellent effect as the friction sliding material, and also since an exfoliated graphite expanded to the extent ranging from several fold to several hundred fold is impregnated or coated with an appropriate amount of a rubber, the addition effect can be recognized by addition of a very small amount. Exfoliated graphite displays a small measure of recoverability although it may be very excellent in compressibility, but one impregnated or coated with a rubber of the present invention is excellent in pressure response, and addition of rubber even in a small amount has very great effect on elasticity, and also there is little effect on elasticity even when under the influences from heat and chemical reaction.

Addition of granulated powder comprising pulp powder and bound with a thermosetting resin was a technique known in the art of paper type friction material as described above, but by applying this to the resin bound friction material, particularly by combining it with rubber-impregnated or coated exfoliated graphite, the peculiar synergistic effect of the present invention can be obtained.

If the frictional material of the present invention is manufactured according to the powder metallurgical manufacturing method as described above, a material having an appropriate amount of communicated voids can be obtained, and the pores will squeeze adequately the oil existing at the interface between the friction material and the mating material, or become the supplying paths of oil from the inside of the material to the friction interface to control the amount of the lubricant oil existing at the interface, whereby the sliding speed-friction coefficient characteristic and interface pressure-friction coefficient characteristic can be well controlled. Also, the oil as the cooling medium can perform cooling not only of the interface but also internally of the material with the communicated pores. Further, the pores have action of enhancing the elasticity of the material. Although the powder metallurgical manufacturing method and the above-mentioned effect in preparation of friction materials have been known in the art, the value of the present invention resides in that the present invention has accomplished improvement of the friction material with a material which can be manufactured according to the powder metallurgical manufacturing method.

The friction material of the present invention having a porosity of 15 to 70% by volume, a modulus of elasticity of elasticity of 10 to 80 kg/mm² brings particularly good results, but also in one having a porosity of 15% or lower, the effect of the filler of the present invention could be recognized.

EXAMPLES

Examples of the present invention according to powder metallurgy are described below. These Examples are presented for confirmation of the effect of the present invention, and the scope of claims are not limited by the Examples at all.

TABLE 1

| | Sample | | | | | | | |
|---|---|---|---|---|---|---|---|---|
| | Comparative | | Example | | | | | |
| Component | 1 | 2 | 1 | 2 | 3 | 4 | 5 | 6 |
| NBR | | | | 5 | 5 | 5 | 5 | |
| CTBN | 15 | | | | | | | |
| Aromatic polyamide fiber | | | 2 | 2 | 2 | | | 2 |
| Carbon fiber | | 5 | 8 | 15 | 18 | 10 | | |
| Glass fiber | 20 | | | | | | | |
| Potassium titanate fiber | | 5 | | | | 10 | | 10 |
| Phenol fiber | | | 10 | | | 10 | | |
| Brass powder | | | | | | | | 5 |
| Cashew dust | 10 | 5 | | | | | | 5 |
| Coke | 20 | 30 | | | | 10 | 10 | 10 |
| Pulp granulated powder | | | | 15 | 20 | 30 | 30 | |
| Rubber-exfoliated graphite | | | 60 | 40 | 30 | 20 | 10 | 5 |
| Graphite | | 25 | | | 5 | | 5 | |

TABLE 1-continued

| | Sample | | | | | | | |
|---|---|---|---|---|---|---|---|---|
| | Comparative | | Example | | | | | |
| Component | 1 | 2 | 1 | 2 | 3 | 4 | 5 | 6 |
| Calcium fluoride | | | 5 | 3 | | | | |
| Molybdenum disulfide | 10 | | | | | | | 3 |
| Silica | 10 | 10 | 5 | 5 | 5 | 5 | 5 | |
| Zirconium sand | | | | | | | | 5 |
| Epoxy resin | 15 | | | | | | | |
| Phenol resin | | | | | | | 5 | 25 |
| Polyimide resin | | 20 | 20 | 20 | 20 | 20 | 20 | |

The starting materials are shown in Table 1. CTBN is carboxy-modified nitrile rubber. Minute amounts of other curing agents, catalysts and antioxidants may be conveniently added in addition to the components listed in the Table.

The respective components shown in the Table were weighed to % by weight shown in the Table, blended by V-type mixer, Ledige mixer or Henschel mixer, filled into a mold of 335 mm in outer diameter, 283 mm in inner diameter and 5 mm in depth and compression molded. The molding obtained was cured at 250° C. for the polyimide resin type and at 180° C. for the phenol resin type for about 4 hours.

The representative physical property values of the lining (or facing) material obtained were found to be 40% of porosity, 200 kgf/cm$^2$ of transverse rupture strength, HR15Y 24 of hardness and 35 kgf/mm$^2$ of modulus of elasticity. The product disc was adhered onto a core plate made of steel with an adhesive, an oil groove for lubricant oil was formed by mechanical working, and the lining (or facing) thickness was ground to 0.9 mm of one surface to be provided for the experiment.

As Comparative example, a rubber type friction material by the kneading sheet method in Comparative example 1, and a coke-graphite type friction material by powder metallurgy manufacturing method in Comparative example 2 are shown. Both are commercially available products or very approximate to commercial products.

In the following, the experimental results are described. Those merely written as Example show the results of Example 3 as representative.

Figure 1:
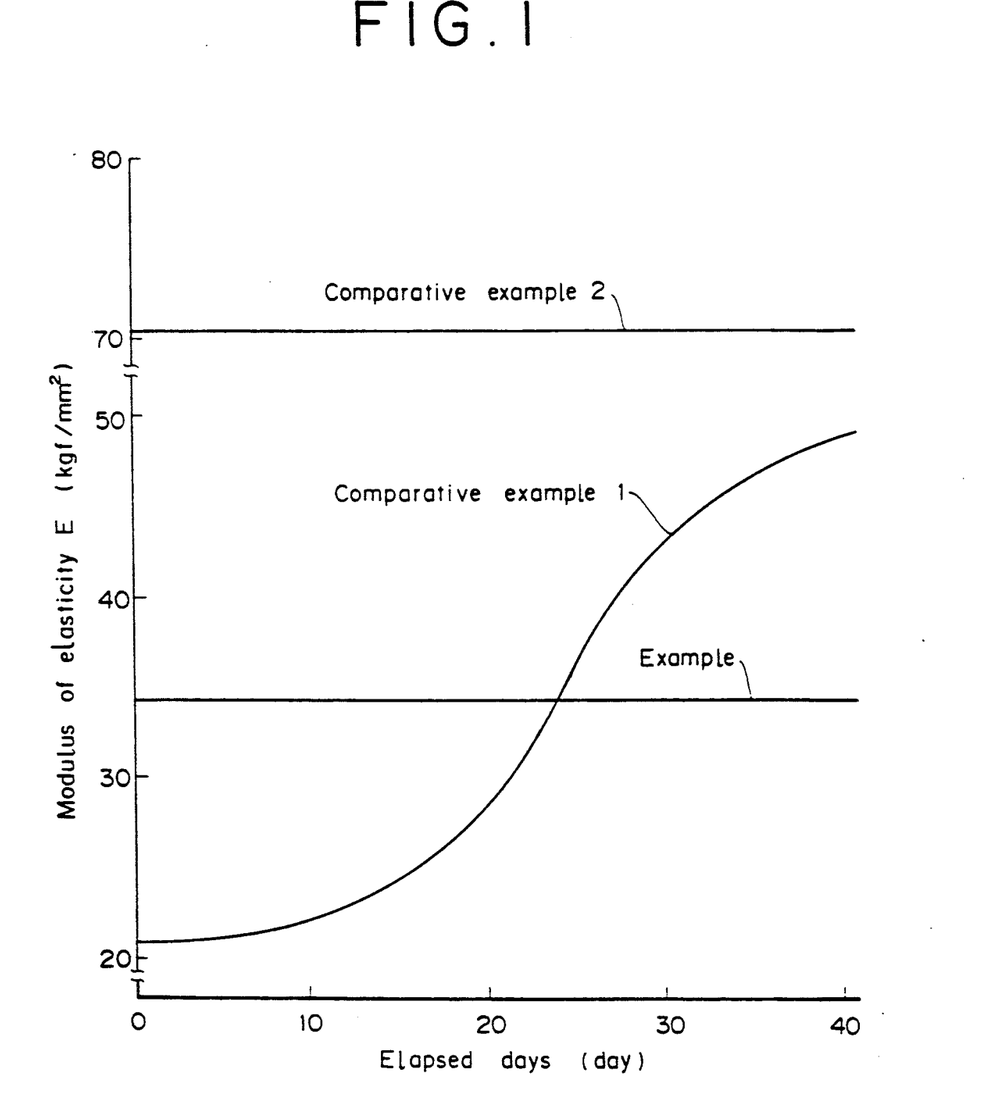
FIG. 1 shows curves representing the relationships between elapsed time and elasticity in frictional characteristics measurement experiments of the friction material of the present invention and the friction material for comparison.

FIG. 1 shows the experimental results of the case when dipped in an oil by use of diesel oil S-3 10W at an oil temperature of 120° C. for a long time with a tube tester. In Comparative example 1, modulus of elasticity of elasticity has become abruptly great with lapse of dipping time, whereby the lining material has become hard. On the other hand, in Comparative example 2, there is no change with lapse of time, but modulus of elasticity of elasticity is high and heat spot is generated when engaged as clutch or brake, with the seizure limit (allowable energy absorption capacity) being small. Example maintained stable adequate modulus of elasticity of elasticity.

Figure 2:
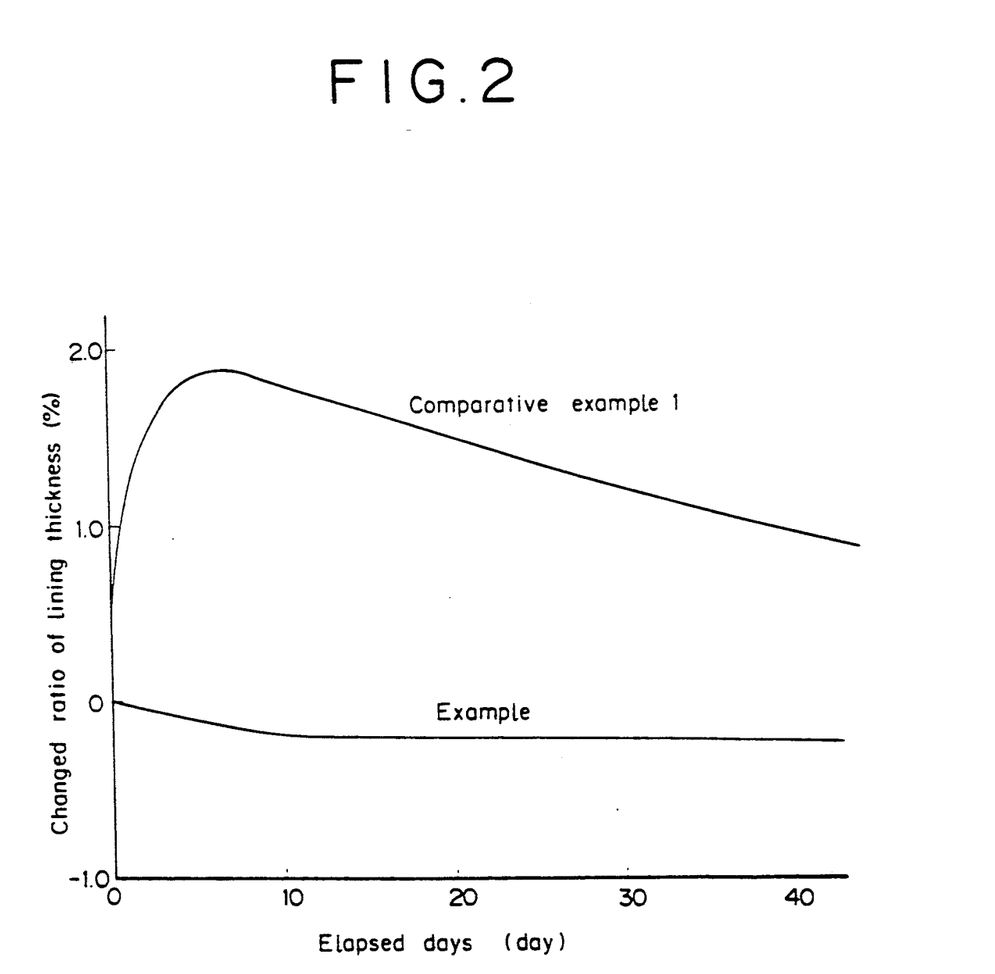
FIG. 2 shows similarly curves representing the relationships between elapsed time and lining thickness change ratio.

FIG. 2 shows the results of swelling when dipped in the same oil (diesel oil: S-3 10W, oil temperature: 120° C. and experiment machine: test tube aging tester). As contrasted to Comparative example 1 which is swelled by the influence of the oil or the amount of the oil additive, it can be understood that Example is stable.

Figure 3:
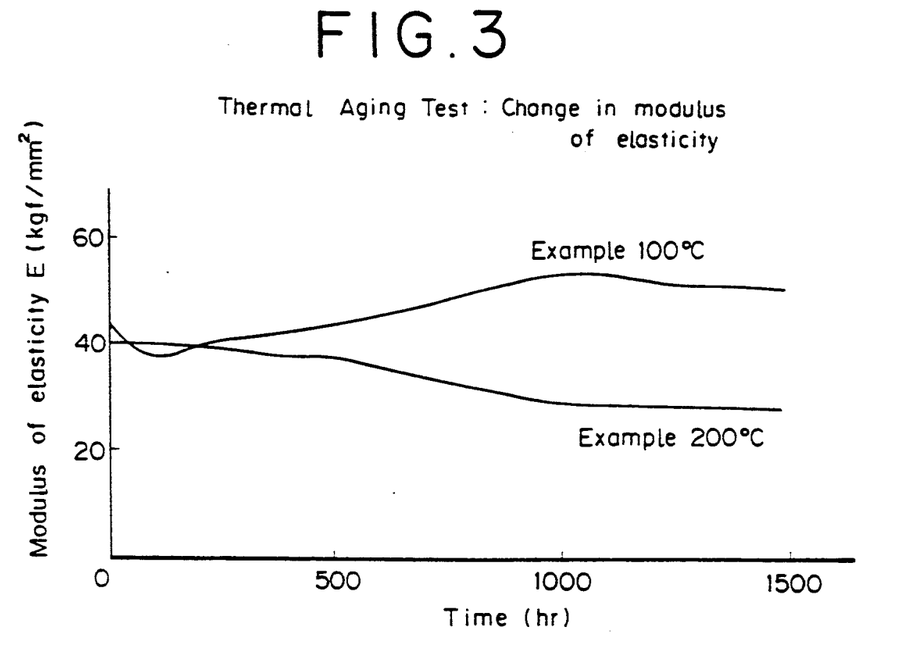
FIG. 3 and FIG. 4 show similarly curves representing the relationships between elapsed time and modulus of elasticity.
Figure 4:
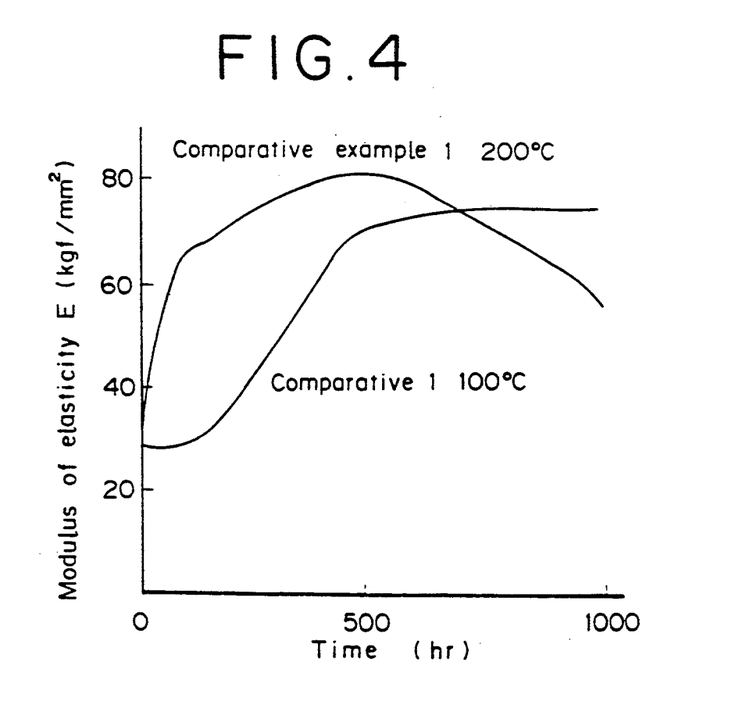

FIG. 3 and FIG. 4 show the changes with lapse of time when exposed to temperatures of 100° C. and 200° C. in the air. It can be understood that Example is stable even at a high temperature of 200° C. Comparative examples 1 is lowered in modulus of elasticity of elasticity at 200° C. after 1000 hours, and this is because the material is hardened and then deteriorated to become brittle.

Figure 5:
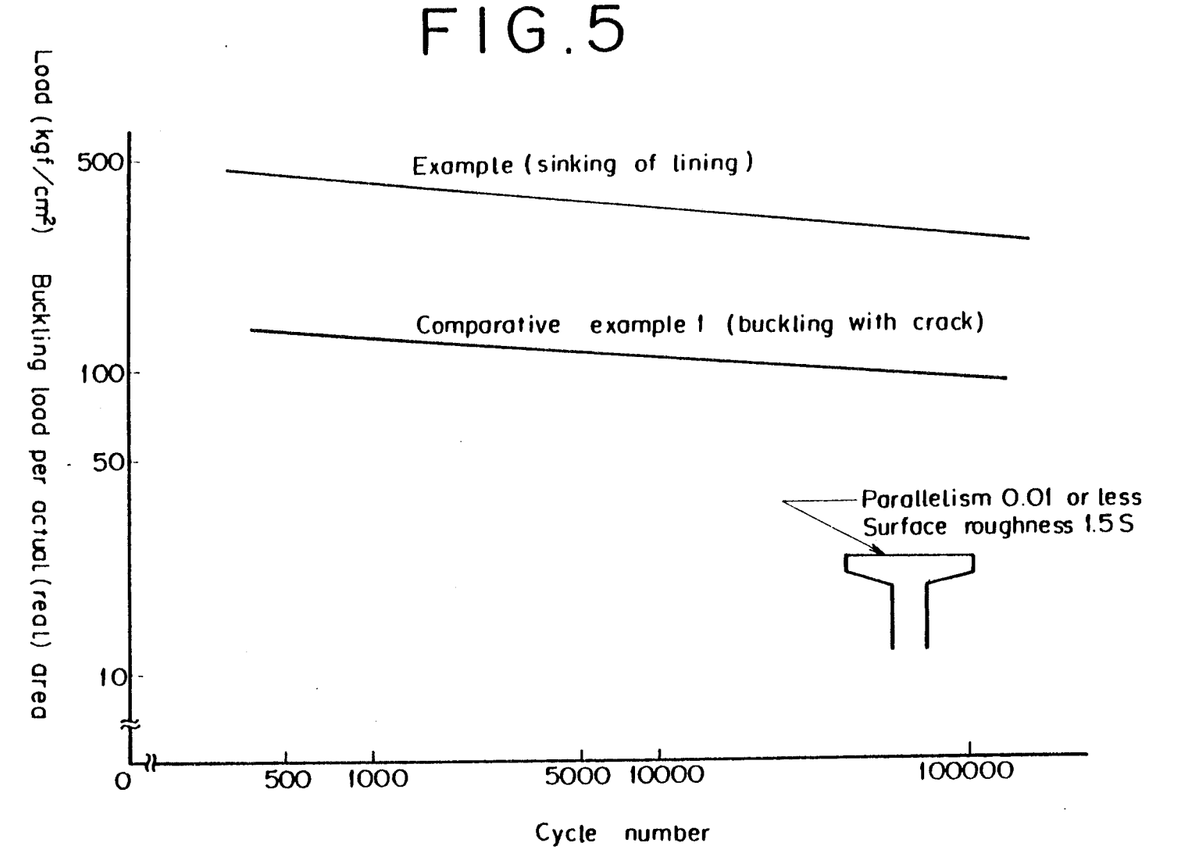
FIG. 5 shows similarly curves representing the relationships between cycle number and buckling load per real area.

FIG. 5 shows the buckling strength of the material during sliding at a temperature of 180° C. (amplitude angle: ±1°, oil species: EO 30-CD, spiral effective area: made as 60%, rotor head: $\phi$20, rotor cycle time: 100 cpm, observation of the surface was carried out per about 500 cycles). The axis of ordinate shows load per actual area applied on the lining, and the axis of abscissa shows cycle number of how many cycles were endured before occurrence of buckling at that load. As compared with Comparative examples, it can be understood that Example is more resistant to load by 3-fold or more. Further, as the mode of buckling, in Comparative examples, cracks are formed in the material to make it into pieces, while in Example, only sinking by load is observed but no crack is formed.

Figure 6:
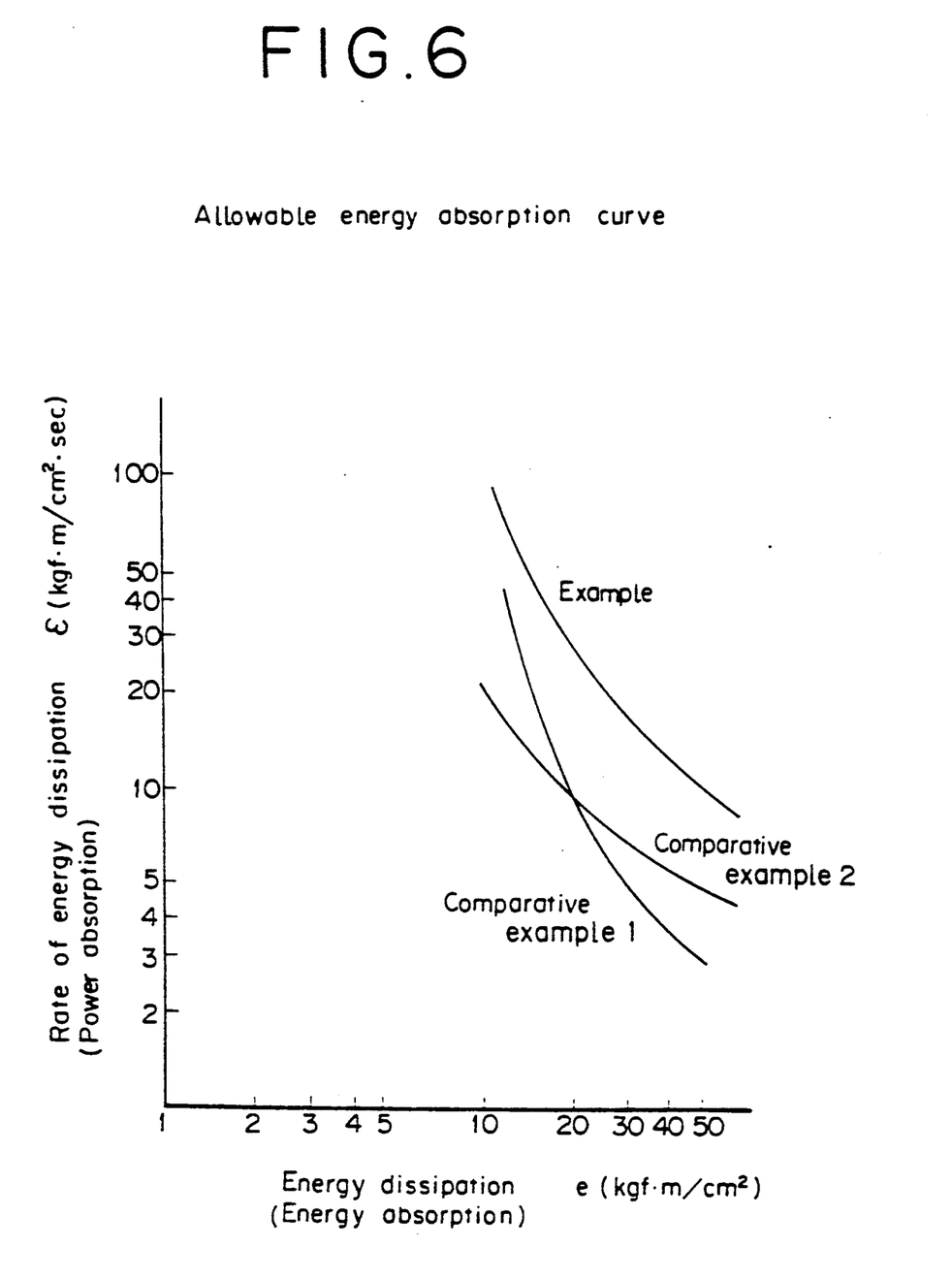
FIG. 6 shows similarly curves representing the relationships between energy absorption and power absorption.

FIG. 6 shows the allowable energy absorption curve (lining size: $\phi$335×$\phi$283.5, total number of friction surfaces: 2 discs (4 surfaces), oil species: diesel engine oil #30, oil temperature: 100° C., oil flow rate: 8 cc/cm$^2$·min). The region above the curve is the dangerous region, and that below the curve is the safe region. It can be understood that Example exhibits very high allowable energy absorption limit and is applicable to heavy duty uses.

Figure 7:
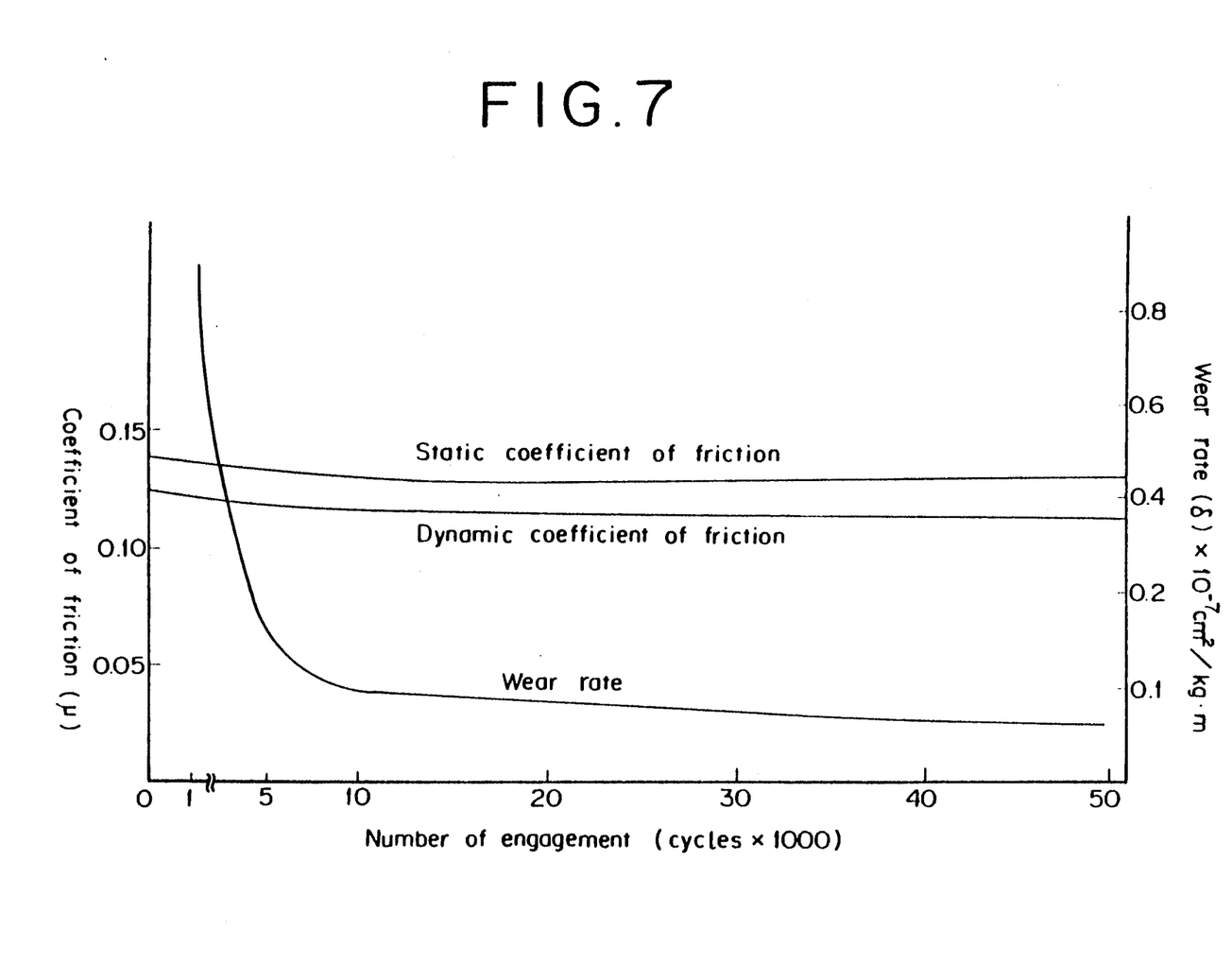
FIG. 7 shows curves representing the relationships between number of engagement, and friction coefficient and wear ratio.

FIG. 7 shows the 50,000 cycles endurance test results under heavy duty of an energy dissipation (energy absorption) of about 20 kgf/cm$^2$ and an power absorption (rate of energy dissipation) of about 10 kgfm/cm$^2$·sec under the test conditions shown below.

Energy dissipation: 20.0 kg m/cm$^2$
Sliding speed: 18.53 m/sec
Rotation number: 1142 rpm
Inertia: 2.807 kg·m·sec$^2$
Unit pressure: 9.0 to 10.1 kg/cm$^2$
Oil species: diesel engine oil-30
Oil flow rate: 8 cc/cm$^2$·min
Oil temperature: 100° C.
Interval: 42 sec/cycle
Groove pattern: waffle groove
Friction material: $\phi$335×$\phi$283.5, 2 discs, 4 surfaces
Mating material: S55C (AISI 1055), surface roughness: max 6 μm.

The product of the energy absorption per unit area and the maximum power absorption per actual unit area is about 650 (kgfm)$^2$/(cm$^2$)(cm$^2$·sec), from which it can be understood that Example has stable coefficient of friction and a tolerable wear amount under heavy duty of about 2-fold of that of the prior art.

TABLE 2

| | Material Comparative example | Material Example |
|---|---|---|
| Test condition 1 | 2 minutes (buckling of material) | 24 hours or longer (no change) |
| Test condition 2 | 30 seconds (buckling of material) | 15 minutes or longer (test discontinued) |

Table 2 shows the test results by continuous sliding. Two discs (4 surfaces) were employed, and the oil was the oil species #30, the oil flow rate 8 cc/cm$^2$·min, and the oil temperature 100° C. The test condition 1 is 8.6 m/sec of sliding speed, 3.1 kgf/cm$^2$ of unit pressure, and the test condition 2 is a sliding speed of 10.0 m/sec and a unit pressure of 7.0 kgf/cm². In Example under the test condition 2, the oil temperature was elevated to the ignition temperature or higher in 15 minutes, and therefore the test was discontinued. It can be understood that Example is a material which is also excellent in continuous sliding.

TABLE 3

| Comparative example | 1 | 2 | | | | |
|---|---|---|---|---|---|---|
| | 680 | 500 | | | | |
| Example | 1 | 2 | 3 | 4 | 5 | 6 |
| | 900 | 1000 | 1000 | 1000 | 900 | 800 |

Table 3 shows the limiting values of the product of the energy absorption per unit area and the maximum power absorption per actual unit area in Examples 1 to 6 and Comparative examples 1 and 2. However, two discs (4 surfaces) of 335 mm in outer diameter and 283.5 mm in inner diameter were employed, the oil was diesel engine oil of the oil species #30, the oil temperature 100° C., the oil flow rate 8 cc/cm²·min, the engagement number 200, and the limit value at an energy absorption of 20 kgm/cm². It can be understood that the effect of the present invention is high.

The present invention provides an excellent wet friction material, and therefore the industrial value of the present invention is great.

We claim:

1. A friction material comprising 5 to 40% by weight of a thermosetting resin as a binder component with a balance being a filler, wherein said filler includes at least an exfoliated graphite, said exfoliated graphite being impregnated or coated with a rubber prior to being combined with said thermosetting resin.

2. The wet friction material according to claim 1, wherein said filler further comprises a porous pulp granulated powder partially bound with the thermosetting resin.

3. The wet friction material according to claim 2, wherein said porous pulp granulated powder bound partially with a thermosetting resin has a porosity of 20 to 70%.

4. The wet friction material according to claim 1, wherein the amount of the exfoliated graphite impregnated or coated with a rubber is 1 to 60% by weight.

5. The wet friction material according to claim 2, wherein the amount of the exfoliated graphite impregnated or coated with a rubber is 1 to 60% by weight.

6. The wet friction material according to claim 3, wherein the amount of the exfoliated graphite impregnated or coated with a rubber is 1 to 60% by weight.

7. A friction material according to claim 4 wherein said exfoliated graphite comprises graphite crystals formed in laminated hexagonal-shaped planes of natural or artificial graphite layers, wherein the interlayer distance of said crystals is expanded ranging from several fold to several hundred fold.

8. The friction material according to claim 7, wherein the interlayer distance of said crystals is expanded ranging from two-fold to two hundred-fold.

9. The friction material according to claim 2, wherein said porous pulp granulated powder comprises cellulose fibers.

10. The friction material according to claim 1, wherein said thermosetting resin is selected from the group consisting of phenol resin and polyimide resin.

11. The friction material according to claim 1, wherein said rubber is selected from the group consisting of natural rubber, acrylonitrile-butadiene rubber, styrene-butadiene rubber, acryl rubber, thiocol rubber, urethane rubber, epichllorohydrin rubber, silicone rubber, fluorine rubber and a hydrogenated or modified rubber thereof.

* * * * *